March 25, 1969 F. LAURENTY 3,434,522
SPRAY TYPE FLASH EVAPORATOR
Filed Nov. 14, 1966
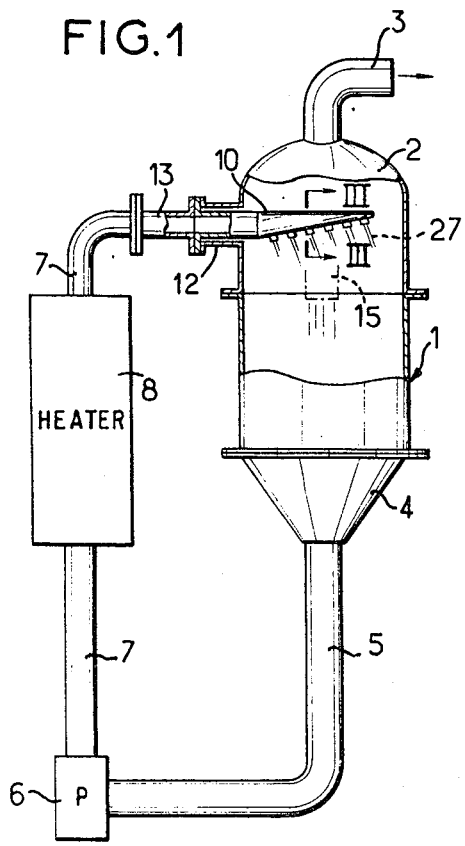
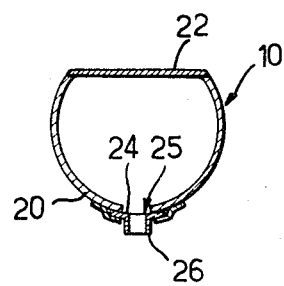
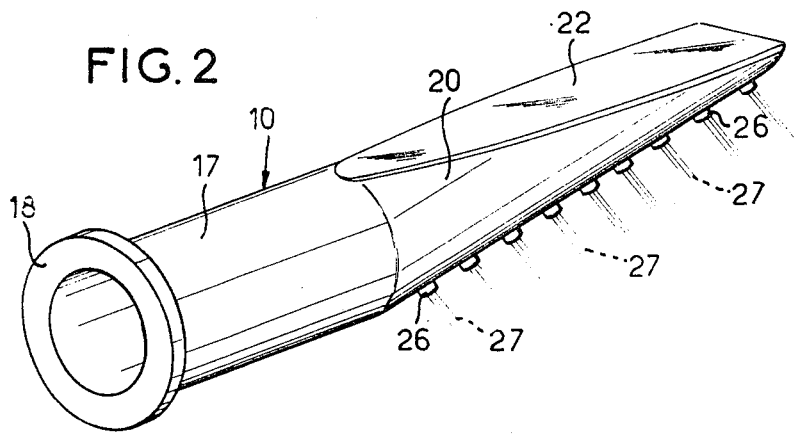

United States Patent Office 3,434,522
Patented Mar. 25, 1969

3,434,522
SPRAY TYPE FLASH EVAPORATOR
Francois Laurenty, Le Champignon 62,
Le Touquet-Paris-Plage, France
Filed Nov. 14, 1966, Ser. No. 593,983
Claims priority, application France, Sept. 21, 1966,
77,091
Int. Cl. B01d 1/16
U.S. Cl. 159—3                                    8 Claims

ABSTRACT OF THE DISCLOSURE

An evaporator vessel has a delivery pipe in its upper section, comprising a horizontal, circular tubular section, and a tubular spout whose lower face is upwardly inclined with respect to the axis of the tubular section. The spout has a top portion which is flat and disposed in a horizontal plane tangent to the uppermost element of the tubular section. The inclined bottom portion of the spout has a series of discharge nozzles therealong.

---

In most known evaporators, especially in evaporators used in chemical industries, a liquid flow, previously heated, goes through, as a single stream a large vessel the wall of which has been calorifuged. The small outer surface of this stream, heated by the inner flow within the stream, gets colder and produces the amount of stream required, that is in proportion to the temperature of the stream or more exactly, of the temperature supplied by the heater unit.

In some evaporators, in order to increase the evaporation surface, which, for a given power of evaporation means lowering the specific evaporating power (evaporating power in relation to a unit of evaporation surface) a spreading of the liquid stream over the inner wall of the vessel is effected. The evaporation surface is increased by 5 to 10 times, but such evaporators need relatively powerful circulating-pumps, and are then more expensive than the former ones.

In other evaporators, with the same end in view, the liquid to be evaporated is spread by Raschig type rings and streams down over them. In these evaporators, more efficient than the former ones, the evaporating surface is multiplied by 30 to 100 times, the specific evaporating-power being itself lowered by 30 to 100 times.

The efficiency of evaporators, if the cost price is brought into its evaluation, i.e., the cost of the energy producing the evaporating-power, increases as the specific evaporating-power decreases.

When evaporation is performed for crystallization of miscellaneous bodies in solution in the liquid stream, it is advantageous to be able to control the number of crystals formed.

It has been found that the formation of crystals takes place where the specific evaporating-power is at its highest. It is thus possible to change the crystallization by altering the specific evaporating-power.

Of the three kinds of evaporators studied, the best are the last named ones, the worst being the first ones which are also the most widely in use.

These three kinds of evaporators however all have the same drawback; the liquid surface subject to evaporation is determined once and for all and is practically invariable.

Transformation of single stream types of apparatus into spread-stream ones which are a little better, can only be effected by expensive mechanical alterations necessitating interruption of work for some days, which is usually unacceptable. It is necessary also to modify the characteristics of pressure and of flow of the circulating-pump.

Again the transformation of a single stream evaporator into a stream-down type is still more onerous since this necessitates taking off the evaporating vessel to put in supporting railings for the Raschig rings, which again leads to serious interruptions of work.

The present invention aims to provide an evaporator having an increased efficiency with respect to known ones, of such a conception that it can be easily produced by the simple rapid and cheap transformation of a known evaporator of less efficiency.

An evaporator constructed according to the invention, of a kind including an evaporating vessel in which the liquid flow to be evaporated, heated and brought into circulation by a pump, is introduced by means of a delivery tube entering the upper part of the vessel is characterized in that the said delivery tube is adapted to divide the liquid flow into a plurality of separate streams.

In such an apparatus the delivery tube is fastened to a tubular portion having a flange for joining it to the tube supplying the liquid to be evaporated, the said portion and flange being arranged to permit, an an ordinary evaporator, the interchange of the delivery tube of the invention with the discharge tube with which such an evaporator is usually equipped.

It is thus very easy to change the delivery tube. The liquid flowing from the delivery tube in a plurality of streams offers a large evaporating surface conductive, as has already been seen, to a better efficiency of the apparatus.

The invention will be more fully understood from the following description, given only as an example with reference to the annexed drawings in which:

FIGURE 1 is a schematic view, in section, of an embodiment of the evaporator according to the invention;

FIGURE 2 is a detailed view of this evaporator, showing the delivery tube for the liquid to be evaporated;

FIGURE 3 is a section of the delivery tube along the line III—III of FIGURE 1;

Figure 4:
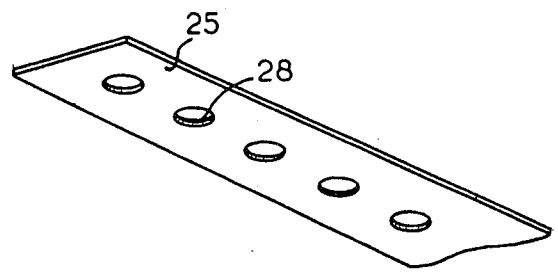

FIGURES 4 to 7 show several ways of arranging the discharge orifices of the delivery tube according to the invention In the embodiment shown, the evaporator according to the invention includes usually a metallic vessel 1, comprising many tubular components connected by flanges, and closed at its upper part by a dome 2 from the centre of which extends an outlet pipe 3 for vapor and on its lower part by a bottom 4 in the shape of a truncated cone from which leads a recycling tube 5 connected to the inlet of a circulating-pump 6. The compression-tube 7 of this pump extends through a heating unit 8 and continues at the end of the latter as a delivery tube 10 entering the upper part of the vessel 1, through a flanged tubular section 12. The tube 10 is connected to the tube 7 by means of at least one horizontal tubular section 13 and secured by flanges.

This manner of assembly is usually seen in known evaporators, in which the delivery tube is bent and has a discharge neck, directed, along the vertical axis, towards the bottom of the vessel. Such a delivery tube is shown in dash-dotted lines (reference 15) on FIGURE 1.

The delivery pipe 10, according to the invention, shown in more detail in FIGURES 2 and 3, is made as follows:

It comprises a tubular section 17 one end of which carries a fixing flange 18 and the other end of which forms a spout 20 the axis of which is slightly inclined with respect to that of the section 17. The spout 20 has a portion cut away in a plane tangential to the generatrix of the tubular section 17, and the spout is closed by an iron plate 22 uniting the cut edges of the spout and obturating the end of the spout remote from the tubular section 17.

The bottom of the spout is provided with a series of orifices for the passage of liquid to be evaporated.

In the embodiment described a longitudinal slot 24 is made in the bottom of the spout 20 and is covered by a closure plate 25 having a plurality of discharge nozzles. This plate 25 is preferably removably mounted in guide tracks carried by the edges of the slot. This arrangement enables a set of plates provided with different numbers of nozzles having various shapes and dispositions to be used on the same delivery tube so that an appropriate plate may be chosen for a given evaporation operation.

Thus, the liquid flowing from the heating unit 8 and compressed by the pump 6 runs into the evaporating vessel 1 throguh the nozzles in a plurality of separate streams 27.

In this way, an enlargement of the evaporating surface is obtained which, as previously indicated, is advantageous.

It will be observed moreover that it is very easy, in a known evaporator as shown in FIGURE 1 provided with the bent delivery tube 15, to replace the latter by a delivery tube 10 according to the invention without interrupting the operation of the evaporator for long periods.

It is sufficient, in fact, to remove the tubular section 13 and the delivery tube 15 secured by a flange to the inlet tube 12 of the evaporating vessel, and then to place in position and fix the delivery tube 10 and to replace the tubular section 13.

The interruption necessitated by this change does not generally exceed three hours.

There may be between 2 and 200 openings or nozzles 26 in the spout 20 and the resulting liquid jets have an outer surface up to 100 times greater than that of a single jet or stream.

The total cross sectional area of the orifices or nozzles 26 is preferably chosen to be equal or substantially equal to that of the tube 17 (that is to say equal also to that of the bent delivery tube 15 which it replaces).

It will be seen that the circulation pump does not need to be changed. The loss of additional pressure which must result from the division of the stream involves a loss of speed which is negligible compared with gain produced in evaporator efficiency.

It is possible to give the nozzles 26 an orientation and a profile such that the corresponding liquid streams run away without agitation, so that no drops can possibly be carried along towards the separator with which the evaporator is usually equipped. This fact enables the separator to be omitted with a resultant lowering of the cost of the installation.

FIGURES 4 to 7 illustrate various embodiments of the plate 25 carrying the discharge nozzles or openings.

In FIGURE 4, the plate 25 has a series of circular openings 28.

Figure 5:
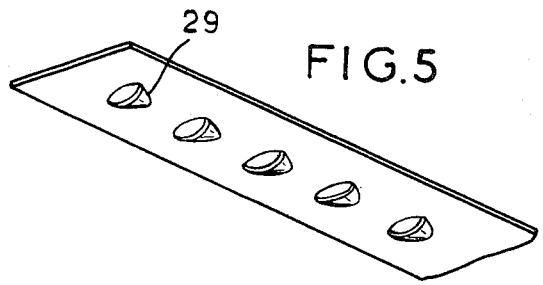

In the embodiment of FIGURE 5, the discharge openings 29 are pressed out of the plate 25.

Figure 6:
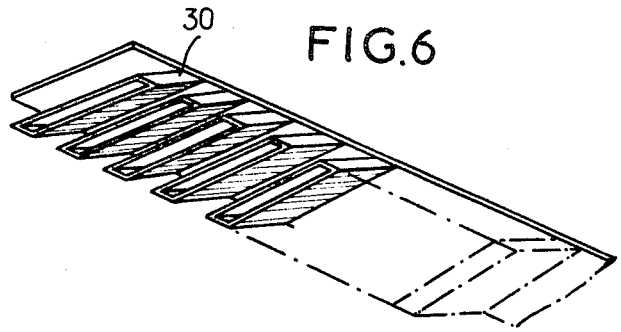
Figure 7:
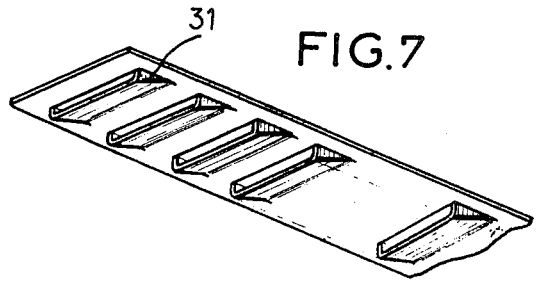

The plate of FIGURE 6 carries nozzles 30 of rectangular section made by bending and welding sheet iron, whereas in the plate in FIGURE 7 the nozzles 31, also of rectangular section, are made by pressing, in the same way as openings 28 of FIGURE 5.

What I claim is:

1. A flash evaporator-separator vessel having horizontal collar in the vessel, a delivery pipe in an upper portion of the vessel passing through said collar, the delivery pipe comprising a horizontal tubular section, and joined thereto a tubular spout of a transverse section of a size no larger than the tubular section the axis of which spout is upwardly inclined with respect to the axis of said tubular section, the spout having as its top a horizontal flat sheet in a plane tangent to the uppermost element of said tubular section, the spout having a series of downwardly directed discharge nozzles along the lowest element of its upwardly inclined bottom portion said delivery pipe being of a size to pass axially through said collar.

2. Apparatus as claimed in claim 1, said tubular section being circular in cross section, said spout being part-cylindrical about said upwardly inclined axis.

3. Apparatus as claimed in claim 1, said discharge nozzles having their axes all disposed in the same direction.

4. Apparatus as claimed in claim 1, said tubular section having an affixing flange at its end remote from said spout for attachment to a similar flange on a feed pipe.

5. Apparatus as claimed in claim 1, the axes of said nozzles being parallel to inclined to the axes of said spout.

6. Apparatus as claimed in claim 1, the orifices of said nozzles having a rectangular cross section.

7. Apparatus as claimed in claim 1, said bottom portion of the spout having a longitudinal slot therealong, and a closure plate covering said slot, said discharge nozzles being disposed in said closure plate.

8. Apparatus as claimed in claim 6, and guide tracks carried by the edges of said slot, said closure plate being removably disposed in said guide tracks.

References Cited

UNITED STATES PATENTS

| | | | |
|---|---|---|---|
| 1,516,314 | 11/1924 | Sebald | 159—2 X |
| 1,927,555 | 9/1933 | Oetken | 159—2 X |
| 2,976,794 | 3/1961 | Allender et al. | 98—38 |
| 3,212,719 | 10/1965 | Di Corpo | 239—566 |

NORMAN YUDKOFF, Primary Examiner.

J. SOFER, Assistant Examiner.

U.S. Cl. X.R.

239—566, 568